(12) United States Patent
Aguera et al.

(10) Patent No.: US 8,346,017 B2
(45) Date of Patent: Jan. 1, 2013

(54) INTERMEDIATE POINT BETWEEN IMAGES TO INSERT/OVERLAY ADS

(75) Inventors: Blaise Aguera y Aguera, Seattle, WA (US); Brett D. Brewer, Sammamish, WA (US); Steven Drucker, Bellevue, WA (US); Karim Farouki, Seattle, WA (US); Gary W. Flake, Bellevue, WA (US); Tomasz Kasperkiewicz, Redmond, WA (US); Stephen L. Lawler, Redmond, WA (US); Donald James Lindsay, Mountain View, CA (US); Adam Sheppard, Seattle, WA (US); Richard Stephen Szeliski, Bellevue, WA (US); Jeffrey Jon Weir, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1253 days.

(21) Appl. No.: 12/112,567

(22) Filed: Apr. 30, 2008

(65) Prior Publication Data

US 2009/0274391 A1 Nov. 5, 2009

(51) Int. Cl.
*G06K 9/36* (2006.01)
*G06K 9/00* (2006.01)
*G06K 9/46* (2006.01)

(52) U.S. Cl. .............................. 382/285; 382/154
(58) Field of Classification Search .................. 382/154, 382/190, 285; 345/419, 420; 235/375, 431; 703/2, 7; 715/764
See application file for complete search history.

(56) References Cited

U.S. PATENT DOCUMENTS

| 6,573,907 | B1* | 6/2003 | Madrane ........................ 715/719 |
| 7,889,193 | B2* | 2/2011 | Platonov et al. .............. 345/419 |
| 7,909,238 | B2* | 3/2011 | Flake et al. ................... 235/375 |
| 2007/0239409 | A1* | 10/2007 | Alan ................................. 703/2 |
| 2008/0151315 | A1* | 6/2008 | Flake et al. ................... 358/401 |
| 2009/0152341 | A1* | 6/2009 | Kasperkiewicz et al. ...... 235/375 |
| 2009/0172570 | A1* | 7/2009 | Arcas et al. ................... 715/764 |
| 2009/0251407 | A1* | 10/2009 | Flake et al. ................... 345/156 |
| 2009/0274391 | A1* | 11/2009 | Arcas et al. ................... 382/285 |
| 2009/0279784 | A1* | 11/2009 | Arcas et al. ................... 382/190 |
| 2009/0283676 | A1* | 11/2009 | Skoglund ...................... 250/307 |
| 2009/0310851 | A1* | 12/2009 | Arcas et al. ................... 382/154 |

* cited by examiner

*Primary Examiner* — Amir Alavi
(74) *Attorney, Agent, or Firm* — Lee & Hayes, PLLC

(57) ABSTRACT

The claimed subject matter provides a system and/or a method that facilitates simulating a portion 2-dimensional (2D) data for implementation within a 3-dimensional (3D) virtual environment. A 3D virtual environment can enable a 3D exploration of a 3D image constructed from a collection of two or more 2D images, the 3D image is constructed by combining the two or more 2D images based upon a respective image perspective. An analyzer can evaluate the collection of two or more 2D images to identify a portion of the 3D image that is unrepresented by the combined two or more 2D images. A synthetic view generator can create a simulated synthetic view for the portion of 3D image that is unrepresented, the simulated synthetic view replicates a 2D image with a respective image perspective for the unrepresented portion of 3D image.

20 Claims, 10 Drawing Sheets

INTERMEDIATE POINT BETWEEN IMAGES TO INSERT/OVERLAY ADS

BACKGROUND

Conventionally, web-based ad space, such as web pages or advertisement content included in a webpage are comprised of images or other visual components of a fixed spatial scale, generally based upon settings associated with an output display screen resolution and/or the amount of screen real estate allocated to a viewing application, e.g. the size of a browser that is displayed on the screen to the user.

In addition to finite screen real estate associated with hardware displays, advertisers are further limited by the circumstance that ads are often only secondary content for most any website or page. Accordingly, ad space is generally relegated to small blocks of screen real estate, typically located at the top or along side panels of a web page. While many advertisers have created clever ways to attract a user's attention even with limited amounts of screen real estate, there exists a rational limit to how much information can be supplied by a finite display space under conventional advertising means, whereas actual transactions—the primary goal of the advertiser—usually necessitate a much greater amount of information be provided to the user.

Accordingly, most forms of web-based advertising rely almost exclusively on a click-through advertising model or mechanism in which a fixed spatial scale image is employed to encourage a potential customer to click the ad, whereby the potential customer can then be routed via hyperlink to more extensive amounts of information pertaining to the ad. Furthermore, ads are typically pre-identified and placed in pre-determined locations on websites, web pages, web space, and the like.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate displaying 2-dimensional imagery within a 3-dimensional virtual environment. A content aggregator can collect and combine a plurality of two dimensional (2D) images or content to create a three dimensional (3D) image, wherein such 3D image can be explored (e.g., displaying each image and perspective point) in a virtual environment. In order to provide a complete 3D image to a user within the virtual environment, an analyzer can evaluate authentic views (e.g., pure views from images) in which to identify portions of the 3D image that are unrepresented. A synthetic view generator can create a simulated synthetic view (e.g., interpolations between images and pure views such as a blend projected onto the 3D model). For example, exploring a 3D image within the virtual environment can include a portion of the 3D image that is not represented by a 2D image, yet such portion can be generated and supplemented with a synthetic view that replicates the unrepresented portion (e.g., no pure view exists and a synthetic view is used). Moreover, an ad placement component can incorporate or overlay advertisements into the created synthetic view areas associated with a 3D image in the virtual environment.

In accordance with another aspect of the subject innovation, the synthetic view generator can provide a scripted movement between two or more 2D images utilized to create a 3D image. Within the virtual environment and during a scripted movement between one image and another, the claimed innovation can display an advertisement rather than the natural scripted image to image transition. Moreover, the synthetic view generator and/or the ad placement component can incorporate or overlay advertisements into the 3D virtual environment at intermediate points (e.g., synthetic view points or during scripted movements) without disrupting the displayed images and perspectives of the pure images. In other aspects of the claimed subject matter, methods are provided that facilitate synthesizing a view for a portion of data within a 3-dimensional virtual environment.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
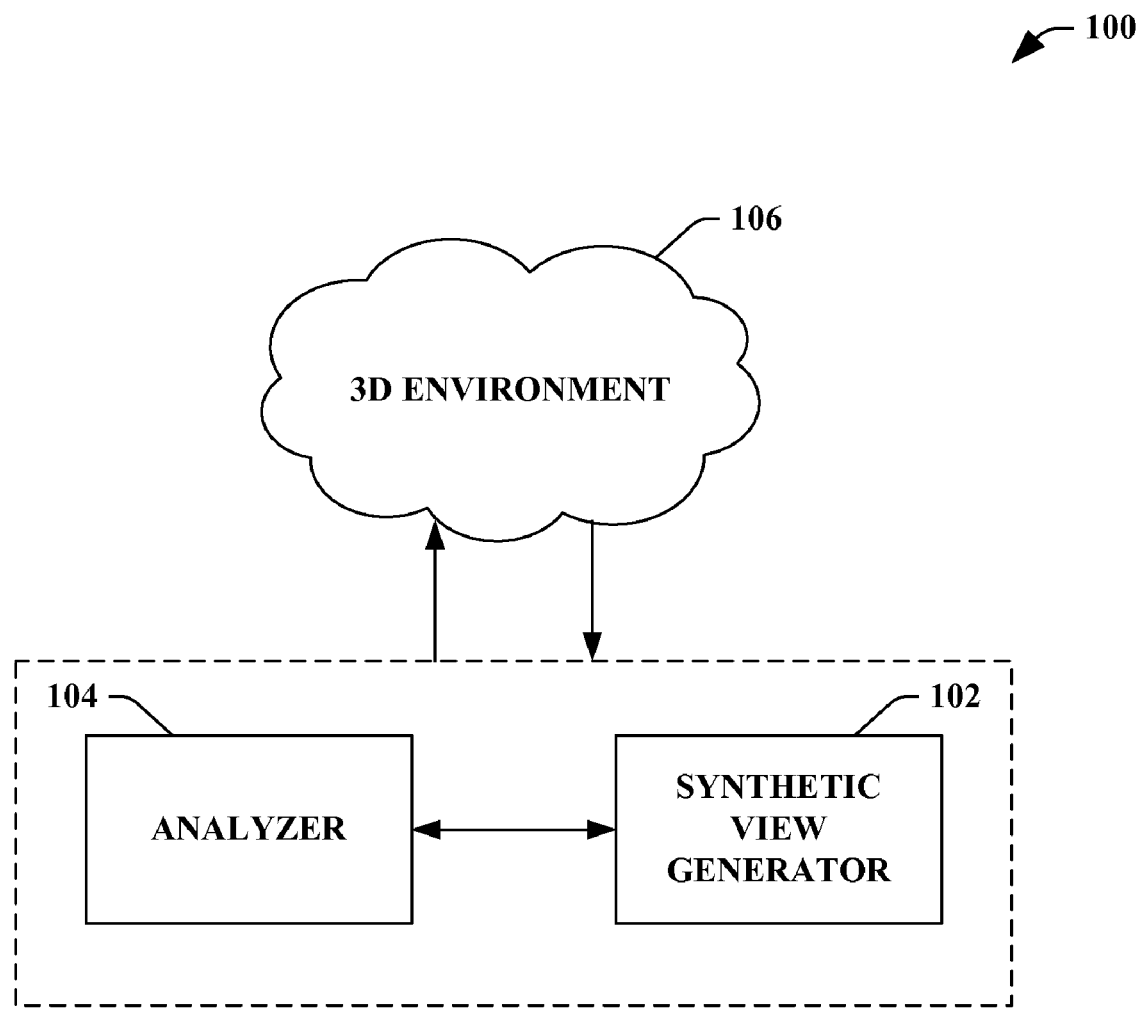
FIG. 1 illustrates a block diagram of an exemplary system that facilitates synthesizing a view for a portion of data within a 3-dimensional virtual environment.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "engine," "generator," "analyzer," "aggregator," "environment," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates synthesizing a view for a portion of data within a 3-dimensional virtual environment. The system 100 can include an analyzer 104 that can evaluate two or more 2-dimensional images with pure imagery and a perspective (e.g., point of view, etc.) in order to identify a portion of data that is unrepresented or not displayed in comparison with the pure imagery. The system 100 can further include a synthetic view generator 102 that can create a simulated synthetic view for the unrepresented portion of data. In other words, two or more 2D images can include imagery related to a particular object (e.g., person, place, landscape, item, etc.), yet the object may not be fully represented or displayed. In such a case, the synthetic view generator 102 can create a synthetic view for the portion of the object that is unrepresented or not displayed in order to provide a complete collection of 2D images having imagery for the particular object (e.g., the 3D image).

Moreover, the system 100 can include a 3D environment 106 that can include the two or more 2D images each having a specific perspective or point-of-view. In particular, the 2D images can be aggregated or collected in order to construct a 3D image or object, wherein the collection and/or aggregation can be based upon each 2D image perspective. Thus, the 2D images can be constructed in order to provide a 3D image within the 3D environment that can be explored, navigated, browsed, etc. It is to be appreciated that the 3D constructed object (e.g., image, etc.) can be from any suitable 2D content such as, but not limited to, images, photos, videos (e.g., a still frame of a video, etc.), audio, pictures, etc.

For example, a 3D environment can be explored in which the 3D image can be a cube. This cube can be created by combining a first image of a first face of the cube (e.g., the perspective is facing the first face of the cube), a second image of a second face of the cube (e.g., the perspective is facing the second face of the cube), a third image of a third face of the cube (e.g., the perspective is facing the third face of the cube), a fourth image of a fourth face of the cube (e.g., the perspective is facing the fourth face of the cube), a fifth image of a fifth face of the cube (e.g., the perspective is facing the fifth face of the cube), and a sixth image of a sixth face of the cube (e.g., the perspective is facing the sixth face of the cube). By aggregating the images of the cube based on their perspectives or point-of-views, a 3D image of the cube can be created within the 3D environment 106 which can be displayed, viewed, navigated, browsed, and the like.

Following the above example, the analyzer 104 can identify a portion of the cube that is unrepresented by the images and their pure views (e.g., a pure view can be the content displayed/represented by the 2D content). For instance, a perspective looking directly at a corner of the cube may not be represented by the collected 2D images and thus unrepresented and not displayed for the 3D image within the 3D environment 106. The synthetic view generator 102 can generate a synthetic view that simulates the unrepresented content and perspective, here, looking directly at the corner of the cube. It is to be appreciated that the synthetic view generator 102 can create the synthetic view or simulated synthetic view based upon the two or more 2D content or images utilized to construct the 3D image or object. For instance, the two or more images related to the corner of the cube can be analyzed in order to create a synthetic view by merging, blending, combining, extrapolating, inferring, etc. the two or more 2D images related to the unrepresented portion of data. It is to be appreciated that the two or more images can include a portion of substantially similar imagery, which can be utilized to generate an accurate depiction of the unrepresented 3D content or image.

In addition, the system 100 can include any suitable and/or necessary interface component (not shown), which provides various adapters, connectors, channels, communication paths, etc. to integrate the synthetic view generator 102 and/or the analyzer 104 into virtually any operating and/or database system(s) and/or with one another. In addition, the interface component can provide various adapters, connectors, channels, communication paths, etc., that provide for interaction with the synthetic view generator 102, analyzer 104, the 3D environment 106, and any other device and/or component associated with the system 100.

Figure 2:
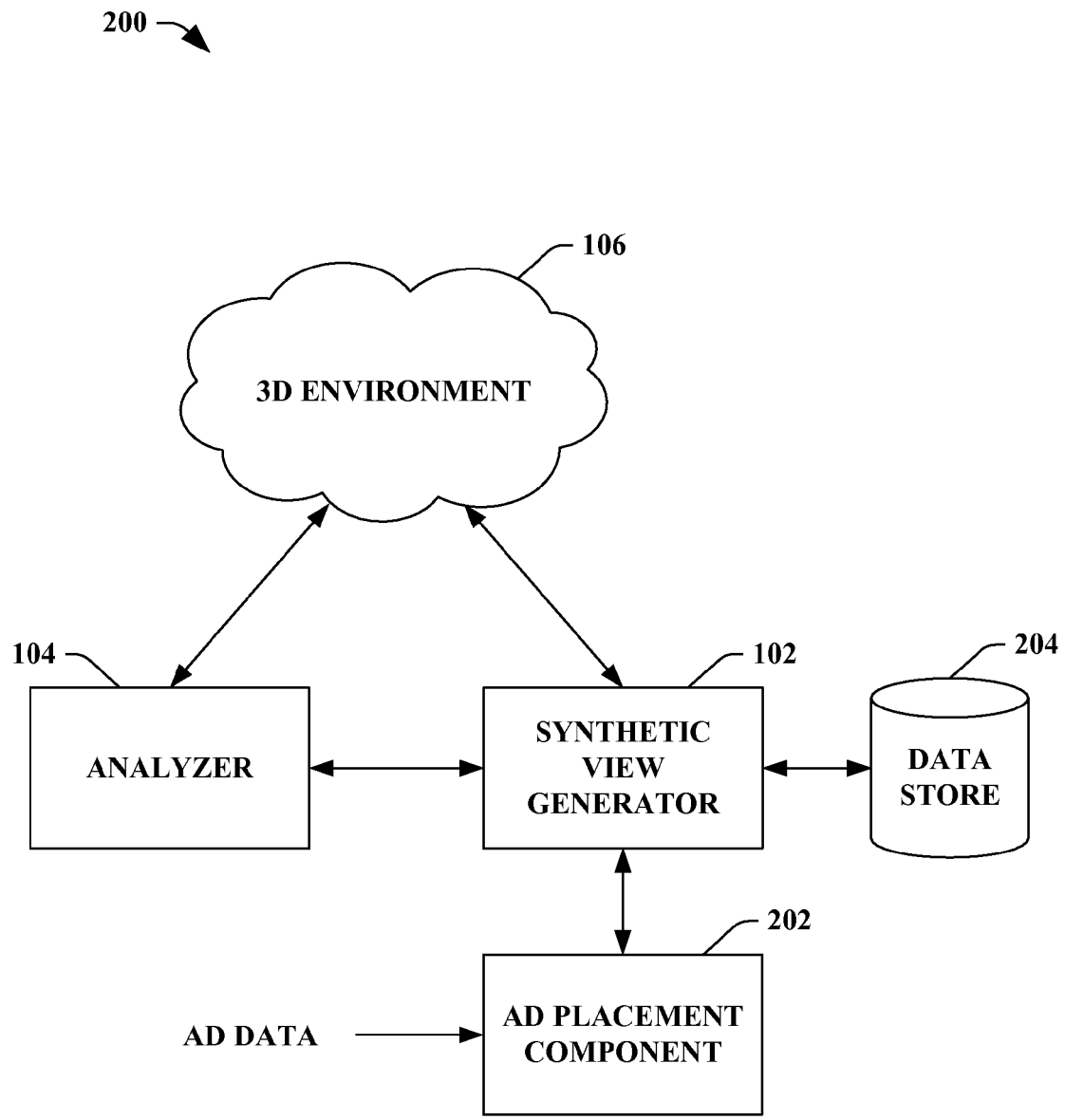
FIG. 2 illustrates a block diagram of an exemplary system that facilitates inserting an advertisement within a 3-dimensional virtual environment created from 2-dimensional content.

FIG. 2 illustrates a system 200 that facilitates inserting an advertisement within a 3-dimensional virtual environment created from 2-dimensional content. The system 200 can include the 3D environment 106 that can host a 3D object that is a collection of two or more portions of 2D content. The 3D object or image can be created from two or more 2D content (e.g., images, still frames, portion of video, etc.) based upon their perspectives or point-of-views. Yet, upon assembling the two or more 2D images, a portion of the 3D object or image may not be represented. The analyzer 104 can identify such unrepresented portions of the 3D object, wherein the synthetic view generator 102 can create a synthetic view or simulated synthetic view to supplement the 3D object or image. Thus, the 3D object can be supplemented with synthetic views in order to provide a more complete representation of the 3D object.

The synthetic view generator 102 can further employ a scripted movement or transition between a first 2D image and a second 2D image utilized to create the 3D object or image, wherein such scripted movement or transition can bridge a gap of unrepresented imagery associated with the 3D object or image. Thus, rather than utilizing a synthetic view or in combination of using a synthetic view, the synthetic view generator 102 can implement a scripted movement or transition in order to conceal or minimize unrepresented 2D content for the 3D object or image. Furthermore, the synthetic view generator 102 can provide a scripted movement or transition in connection with navigation associated with a generated synthetic view. In other words, the synthetic view generator 102 can optimize navigation by dictating transitions and movements while browsing or viewing created synthetic views.

The system 200 can further include an ad placement component 202 that can insert an advertisement (e.g., ad data, image advertisement, slogan, trademark, service mark, video, audio, text, graphics, etc.) within the unrepresented portion of the 3D object or image. In particular, the ad placement component 202 can overlay an advertisement on a synthetic view supplementing the unrepresented portion of the 3D object (e.g., pure views associated with 2D content not displaying a portion of the 3D object or image). Moreover, the ad placement component 202 can insert an advertisement or ad data within a portion of unrepresented imagery. For example, an area that is unrepresented by 2D imagery or content (e.g., unrepresented in comparison to the collection of imagery to create the 3D object or image) can have an ad inserted to occupy the unrepresented area. It is to be appreciated that the ad data or advertisement can be related to any suitable good, item, or service and can be any suitable format such as, but not limited to, a portion of audio, a portion of video, a portion of a graphic, a picture, a photo, a portion of text, a slogan, a trademark, etc.

Additionally, the ad placement component 202 can insert any suitable media or data within an unrepresented area such as, but not limited to, a transient ad, an additional portion of image, a portion of bio data, a portion of audio, a portion of a video, etc. For instance, following the example of the 3D object being a cube, a synthetic view can be overlaid with biography data such as text or author data. In other words, any suitable media or data can be inserted or overlaid into a synthetic view or an unrepresented portion of the 3D constructed object. In another example, the ad placement component 202 can incorporate media based at least in part upon the browsing, exploration, navigation, or viewing of the 3D object or the 2D content within the 3D environment 106.

The system 200 can further include a data store 204 that can include any suitable data related to the synthetic view generator 102, the analyzer 104, the 3D environment 106, the ad placement component 202, etc. For example, the data store 204 can include, but not limited to including, ad data, synthetic view data, 2D content, 3D object data, user interface data, browsing data, navigation data, user preferences for ads, user settings, configurations, scripted movements, transitions, 3D environment data, 3D construction data, mappings between 2D content and 3D object or image, locations associated with areas of a 3D object unrepresented by 2D content, etc.

It is to be appreciated that the data store 204 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 204 of the subject systems and methods is intended to comprise, without being limited to, these and any other suitable types of memory. In addition, it is to be appreciated that the data store 204 can be a server, a database, a hard drive, a pen drive, an external hard drive, a portable hard drive, and the like.

Figure 3:
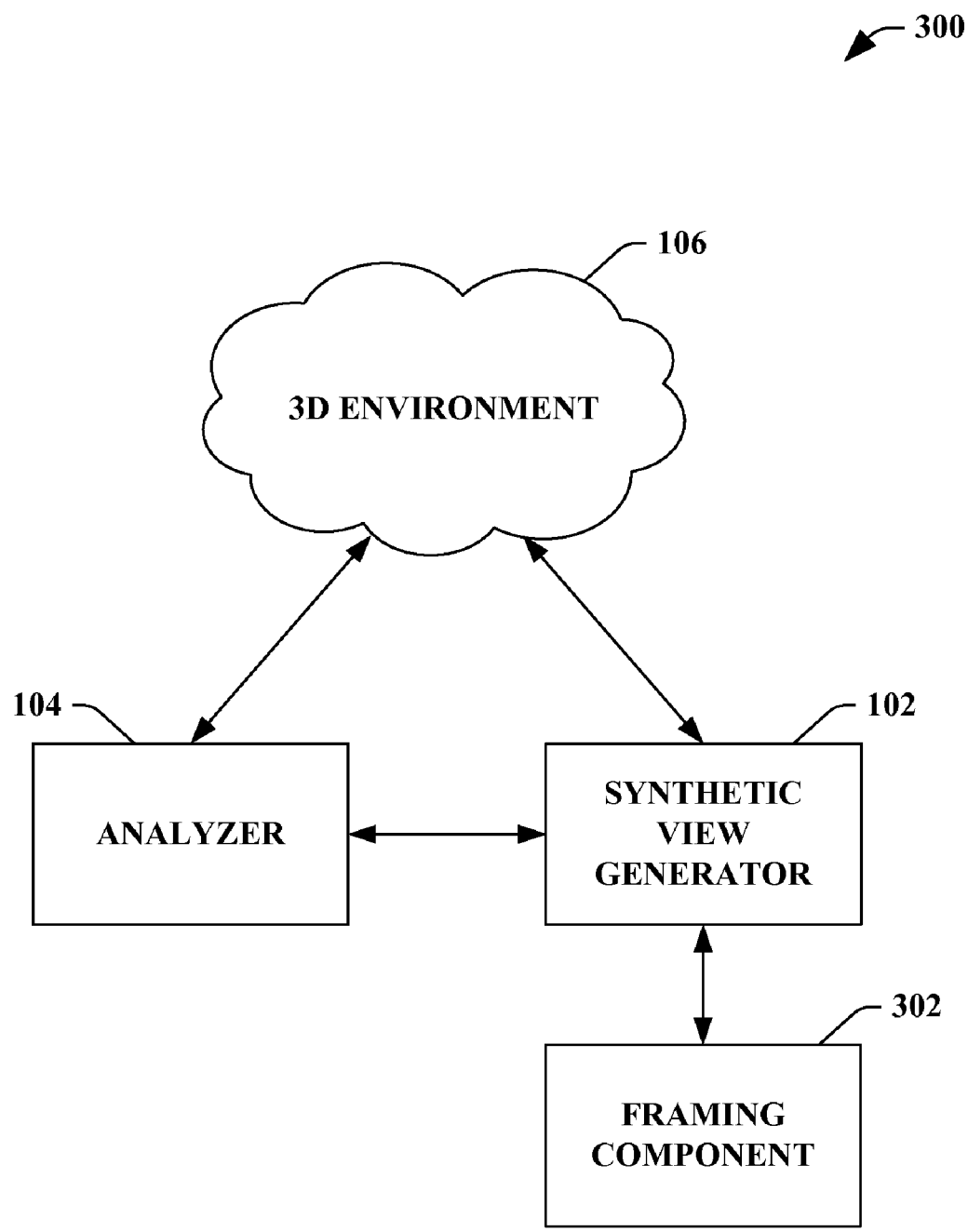
FIG. 3 illustrates a block diagram of an exemplary system that facilitates conveying a simulated view within a 3-dimensional virtual environment utilizing framework.

FIG. 3 illustrates a system 300 that facilitates conveying a simulated view within a 3-dimensional virtual environment utilizing framework. The system 300 can include the synthetic view generator 102 that can create a synthetic view or a simulated synthetic view in order to represent and replicate imagery data from a particular perspective that is unrepresented by two or more 2D images, wherein the two or more 2D images can be aggregated to create a 3D image or object. In particular, the 3D object or image can be constructed by combining the two or more 2D images in accordance with their perspective or point-of-view, yet each perspective or portion of the 3D object or image may not be represented. The analyzer 104 can identify such unrepresented perspectives of the 3D object in order to enable the synthetic view generator 102 to create a replicated portion of imagery from the particular perspective unrepresented.

The system 300 can further include a framing component 302 that can implement a graphical framework of the 3D image or object to which 2D imagery or content can be overlaid. Such graphical framework of the 3D image can be representative of a placeholder for 2D content and perspectives that cannot be replicated with a synthetic view or simulated synthetic view. For example, a collection of 2D images associated with a house can be constructed to create a 3D image of such house (e.g., each image contributes a portion of the view of the house based on the perspective). However, sections of the house may not have 2D images available. In some cases, the synthetic view generator 102 can supplement the 3D image of the house with at least one synthetic view. In other cases, the synthetic view generator 102 may not have sufficient imagery to generate an accurate synthetic view. In these other cases, the graphical framework of the 3D image can be utilized by the framing component 302. In another example, an option to display or not display the graphical framework can be utilized with the option of displaying a portion of the 2D content. In other words, a user can select to show 50% of the 2D content for the 3D object and to show the graphical framework. In another example, the user can opt to show 0% of the 2D content and to show the graphical framework.

For instance, the 3D image of the house can have a graphical framework or skeleton that simulates the image of the house yet has the 2D imagery or content existent on overlaid thereupon. Portions of the 3D image of the house that are not represented can be illustrated by the exposure of the graphical framework. In general, the graphical framework can be seen as a graphical representation of a skeleton of the 3D object, wherein the framework enables illustration of at least one of images that are represented by 2D content, perspectives or imagery that are represented by a synthetic view, or images or imagery that are not available or represented. It is to be appreciated that the graphical framework can be a blueprint, a graphical representation of the object, a sketch of the object, a skeleton for the object, etc.

Figure 4:
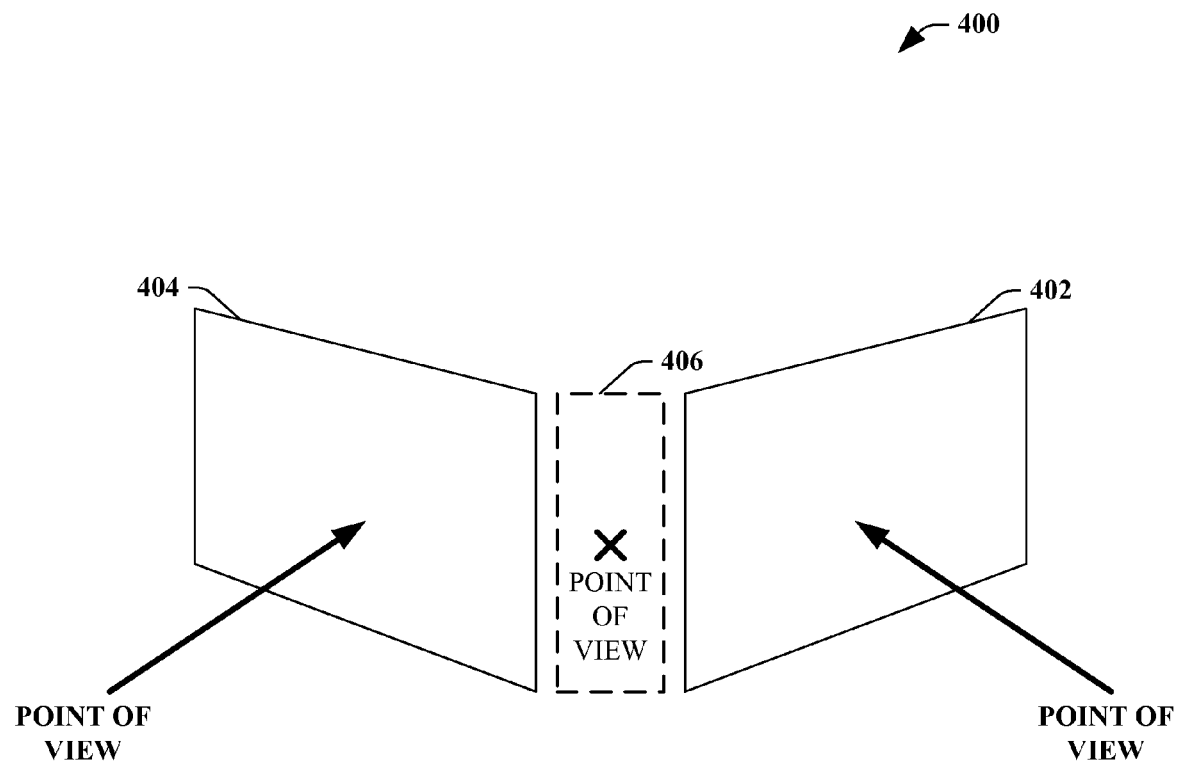
FIG. 4 illustrates a block diagram of an exemplary system that facilitates generating a simulated view between a first portion of 2-dimensional content and a second portion of 2-dimensional content.

FIG. 4 illustrates a system 400 that facilitates generating a simulated view between a first portion of 2-dimensional content and a second portion of 2-dimensional content. The system 400 depicts a portion of a 3D constructed object, wherein such 3D object is created from two or more 2D images. In this particular example, the 3D object includes a first 2D image 402 that is a photograph of a right side of a wall from a particular point of view and a second 2D image 404 that is a photograph of a left side of a wall from a specific point of view. Moreover, the photographs of the left side of a wall and the right side of the wall can meet on a corner of the wall. In other words, the first 2D image 402 meets the second 2D image 404 at the corner, wherein the first 2D image 402 provides a pure view of the right side of a wall and the second 2D image 402 provides a pure view of the left side of a wall. It is to be appreciated that the 3D object can be created from any suitable content and the example described herein with photographs and/or images is not to be limiting on the subject innovation.

As illustrated, the first 2D image 402 and the second 2D image 404 can depict the 3D object with pure views for a high percentage of the object (e.g., here the object can be a first side of a wall, a second side of a wall, and a corner of where the walls meet). However, as depicted by the dotted line portion, an area of the 3D object is unrepresented. In other words, the 3D object has imagery from various points-of-view and perspectives, except an unrepresented area 406. An "X" shows the point-of-view for this particular unrepresented area 406 is into the page or "head-on" into the corner where the two walls meet.

The subject innovation enables the unrepresented area 406 to be replicated or simulated with a synthetic view. The synthetic view can be created by merging, blending, combining, extrapolating, and/or inferring imagery between the first 2D image 402 and the second 2D image 404. It is to be appreciated that the synthetic view can be created by evaluating any suitable imagery (e.g., pure views, etc.) related to the unrepresented area 406. Additionally, the unrepresented area 406 can be associated with a scripted movement or transition in order to mitigate exposure of such area. The unrepresented area 406 can also be filled or overlaid with media such as, but not limited to, ads, advertisements, a transient ad, an additional portion of image, a portion of bio data, a portion of audio, a portion of a video, biographical data, 3D object data, author data, etc. Furthermore, a graphical framework can be utilized with the 3D object, wherein the graphical framework can be exposed within the unrepresented area 406 to depict the non-existence of 2D images or photos (e.g., pure views).

Figure 5:
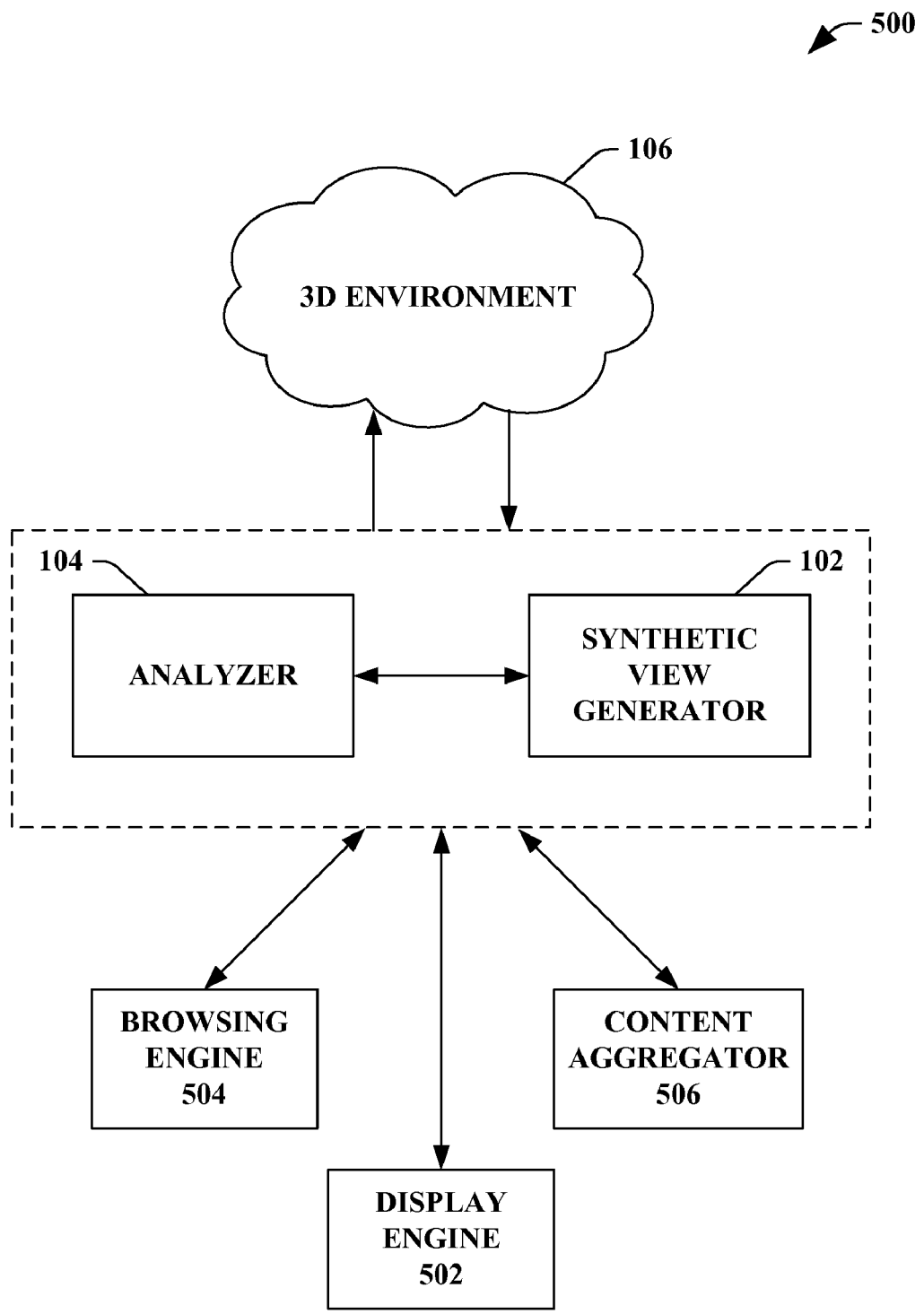
FIG. 5 illustrates a block diagram of exemplary system that facilitates utilizing a display technique, a browse technique, and/or a virtual environment technique in accordance with the subject innovation.

FIG. 5 illustrates a system 500 that facilitates utilizing a display technique, a browse technique, and/or a virtual environment technique in accordance with the subject innovation. The system 500 can include the synthetic view generator 102, the analyzer 104, and the 3D environment 106 as described above. The system 500 can further include a display engine 502 that enables seamless pan and/or zoom interaction with any suitable data (e.g., 3D object data, 2D imagery, content, etc.), wherein such data can include multiple scales or views and one or more resolutions associated therewith. In other words, the display engine 502 can manipulate an initial default view for displayed data by enabling zooming (e.g., zoom in, zoom out, etc.) and/or panning (e.g., pan up, pan down, pan right, pan left, etc.) in which such zoomed or panned views can include various resolution qualities. The display engine 502 enables visual information to be smoothly browsed regardless of the amount of data involved or bandwidth of a network. Moreover, the display engine 502 can be employed with any suitable display or screen (e.g., portable device, cellular device, monitor, plasma television, etc.). The display engine 502 can further provide at least one of the following benefits or enhancements: 1) speed of navigation can be independent of size or number of objects (e.g., data); 2) performance can depend on a ratio of bandwidth to pixels on a screen or display; 3) transitions between views can be smooth; and 4) scaling is near perfect and rapid for screens of any resolution. It is to be appreciated and understood that the display engine 502 can be substantially similar to the display engine 102 described above.

For example, an image can be viewed at a default view with a specific resolution. Yet, the display engine 502 can allow the image to be zoomed and/or panned at multiple views or scales (in comparison to the default view) with various resolutions. Thus, a user can zoom in on a portion of the image to get a magnified view at an equal or higher resolution. By enabling the image to be zoomed and/or panned, the image can include virtually limitless space or volume that can be viewed or explored at various scales, levels, or views with each including one or more resolutions. In other words, an image can be viewed at a more granular level while maintaining resolution with smooth transitions independent of pan, zoom, etc. Moreover, a first view may not expose portions of information or data on the image until zoomed or panned upon with the display engine 502.

A browsing engine 504 can also be included with the system 500. The browsing engine 504 can leverage the display engine 502 to implement seamless and smooth panning and/or zooming for any suitable data browsed in connection with at least one of the Internet, a network, a server, a website, a web page, the 3D environment 106, and the like. It is to be appreciated that the browsing engine 504 can be a stand-alone component, incorporated into a browser, utilized with in combination with a browser (e.g., legacy browser via patch or firmware update, software, hardware, etc.), and/or any suitable combination thereof. For example, the browsing engine 504 can be incorporate Internet browsing capabilities such as seamless panning and/or zooming to an existing browser. For example, the browsing engine 504 can leverage the display engine 502 in order to provide enhanced browsing with seamless zoom and/or pan on a 3D object, wherein various scales or views can be exposed by smooth zooming and/or panning.

The system 500 can further include a content aggregator 506 that can collect a plurality of two dimensional (2D) content (e.g., media data, images, video, photographs, metadata, trade cards, etc.) to create a three dimensional (3D) virtual environment (e.g., 3D environment 106) that can be explored (e.g., displaying each image and perspective point). In order to provide a complete 3D environment 106 to a user within the virtual environment, authentic views (e.g., pure views from images) are combined with synthetic views (e.g., interpolations between content such as a blend projected onto the 3D model). For instance, the content aggregator 506 can aggregate a large collection of photos of a place or an object, analyze such photos for similarities, and display such photos in a reconstructed 3D space to create a 3D object, depicting how each photo relates to the next. It is to be appreciated that the collected content can be from various locations (e.g., the Internet, local data, remote data, server, network, wirelessly collected data, etc.). For instance, large collections of content (e.g., gigabytes, etc.) can be accessed quickly (e.g., seconds, etc.) in order to view a scene from virtually any angle or perspective. In another example, the content aggregator 506 can identify substantially similar content and zoom in to enlarge and focus on a small detail. The content aggregator 506 can provide at least one of the following: 1) walk or fly through a scene to see content from various angles; 2) seamlessly zoom in or out of content independent of resolution (e.g., megapixels, gigapixels, etc.); 3) locate where content was captured in relation to other content; 4) locate similar content to currently viewed content; and 5) communicate a collection or a particular view of content to an entity (e.g., user, machine, device, component, etc.).

Figure 6:
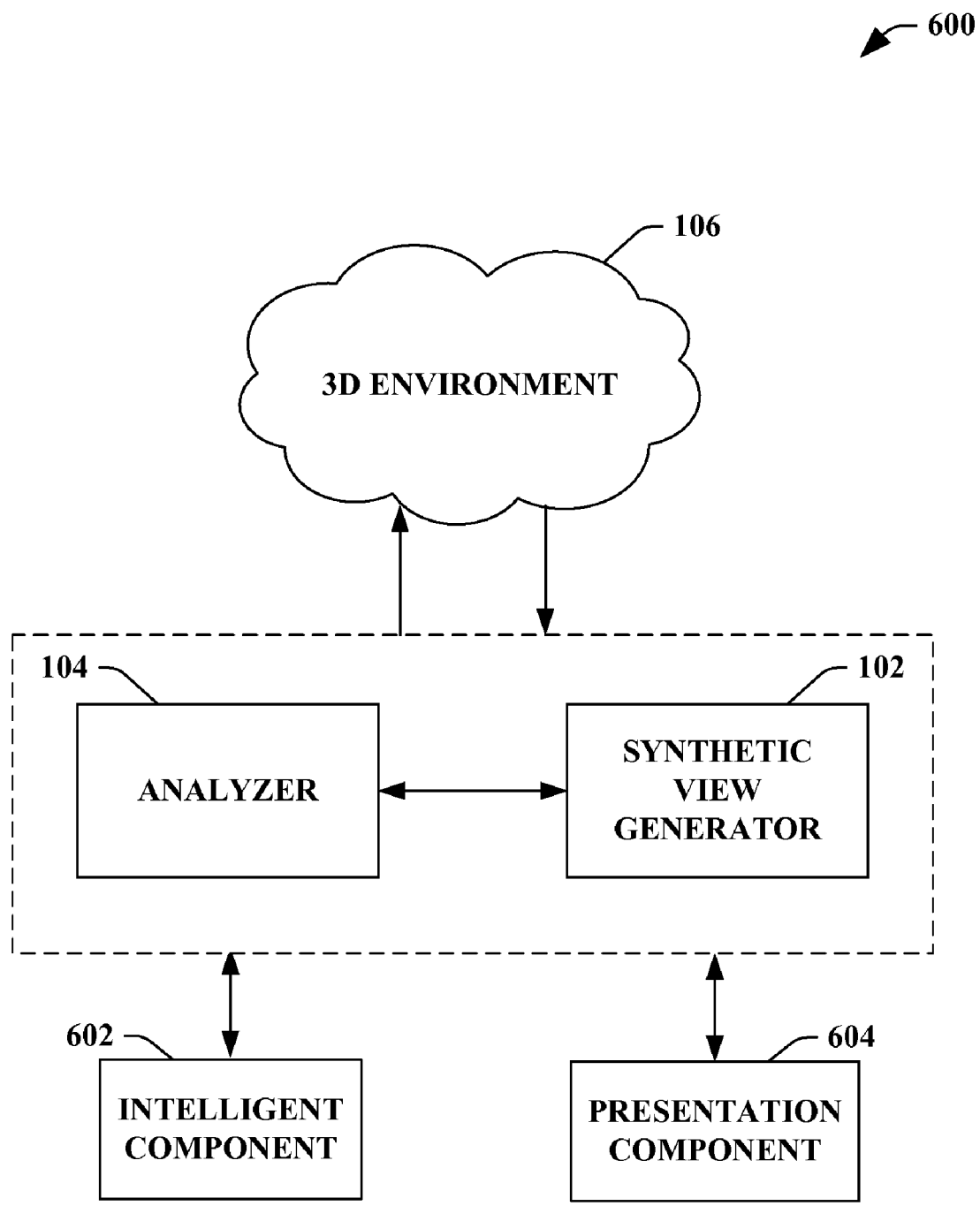
FIG. 6 illustrates a block diagram of an exemplary system that facilitates automatically creating a synthesized or simulated view based upon a portion of 2-dimensional content related to a 3-dimensional virtual environment.

FIG. 6 illustrates a system 600 that employs intelligence to facilitate automatically creating a synthesized or simulated view based upon a portion of 2-dimensional content related to a 3-dimensional virtual environment. The system 600 can include the synthetic view generator 102, the analyzer 104, and the 3D environment 106, which can be substantially similar to respective generators, analyzers, and environments described in previous figures. The system 600 further includes an intelligent component 602. The intelligent component 602 can be utilized by the synthetic view generator 102 and/or the analyzer 104 to facilitate constructing 3D objects from 2D content. For example, the intelligent component 602 can infer synthetic views, blending between 2D imagery, combining imagery, extrapolation between images, unrepresented imagery, simulated synthetic views, advertisements to place in unrepresented areas of the 3D object or image, media to place in unrepresented areas of the 3D object, graphical framework of a 3D object, user preferences, settings, navigation or exploration preferences, etc.

The intelligent component 602 can employ value of information (VOI) computation in order to identify optimal synthetic views for unrepresented portions of the 3D object or media (e.g., advertisements, biographical data, author information, etc.) to overlay for unrepresented portions. For instance, by utilizing VOI computation, the most ideal and/or appropriate synthetic views or media can be determined. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The synthetic view generator 102 can further utilize a presentation component 604 that provides various types of user interfaces to facilitate interaction between a user and any component coupled to the synthetic view generator 102. As depicted, the presentation component 604 is a separate entity that can be utilized with the synthetic view generator 102. However, it is to be appreciated that the presentation component 604 and/or similar view components can be incorporated into the synthetic view generator 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the synthetic view generator 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
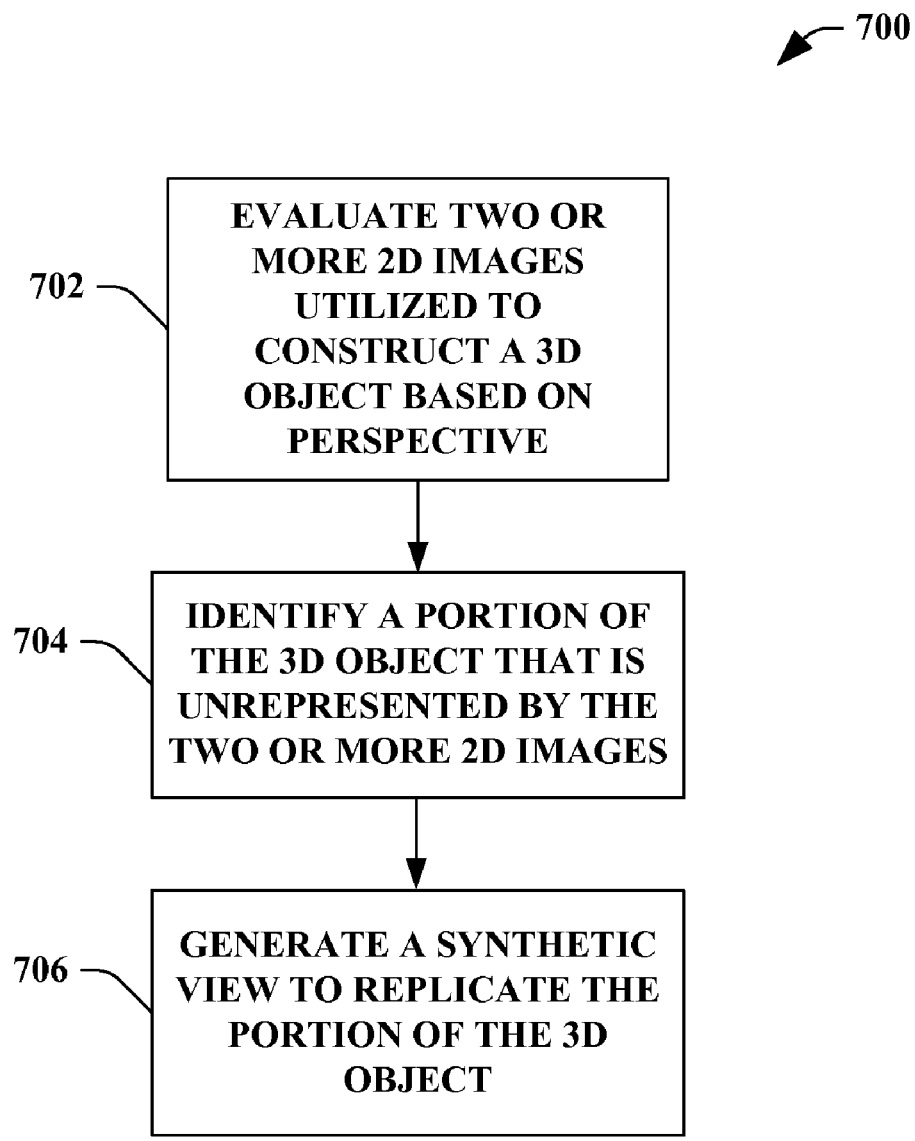
FIG. 7 illustrates an exemplary methodology for synthesizing a view for a portion of data within a 3-dimensional virtual environment.
Figure 8:
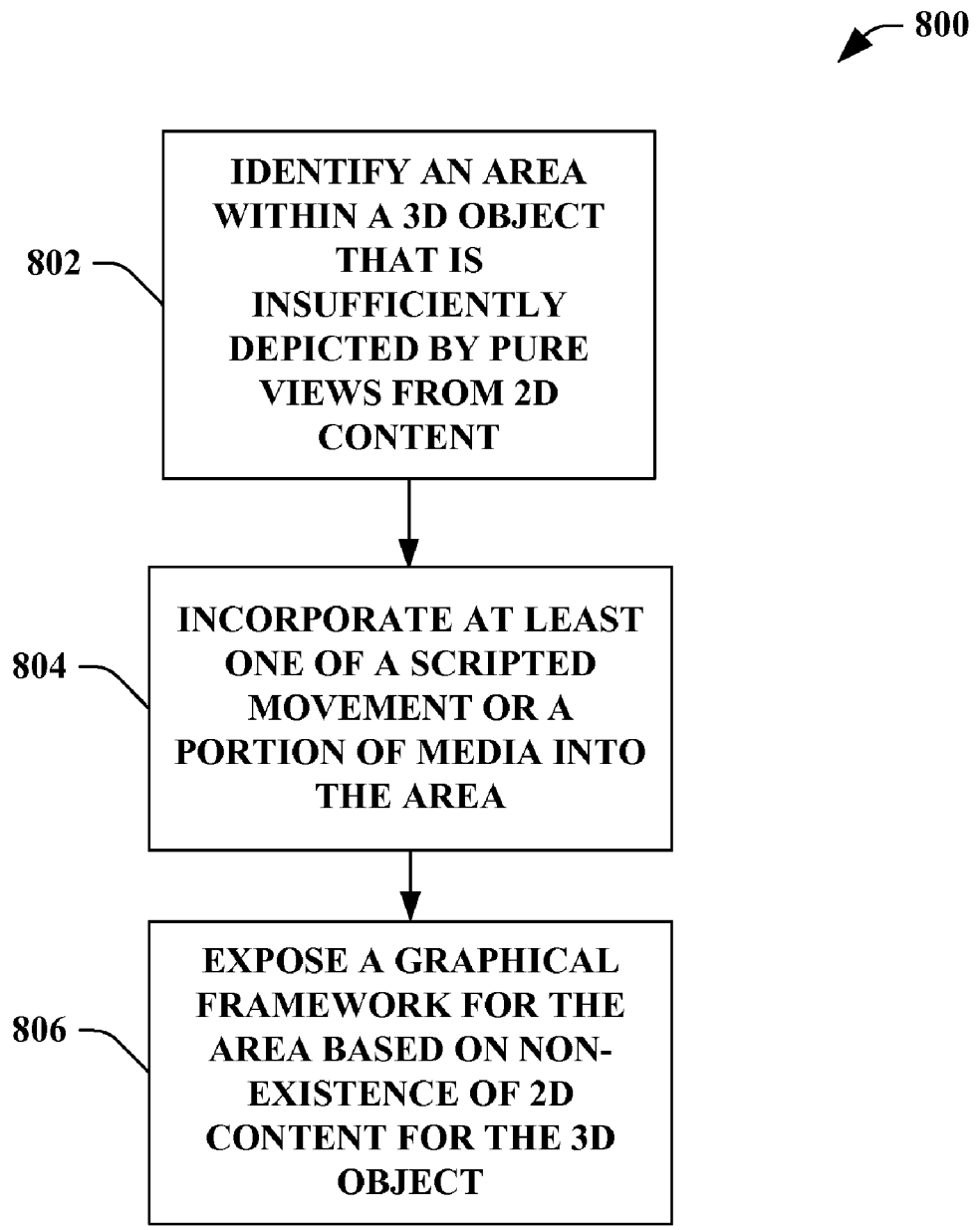
FIG. 8 illustrates an exemplary methodology that facilitates inserting an advertisement within a 3-dimensional virtual environment created from 2-dimensional content.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates synthesizing a view for a portion of data within a 3-dimensional virtual environment. At reference numeral 702, two or more 2D images utilized to construct a 3D object based on perspective of the two or more 2D images can be evaluated. In general, a 3D object or image can be created to enable exploration within a 3D virtual environment, wherein the 3D object or image is constructed from 2D content of the object or image. The 2D imagery is combined in accordance with the perspective or point-of-view of the imagery to enable an assembled 3D object that can be navigated and viewed (e.g., the 3D object as a whole includes a plurality of 2D images or content). For example, 2D pictures of a pyramid (e.g., a first picture of a first side, a second picture of a second side, a third picture of a third side, a fourth picture of a fourth side, and a fifth picture of a bottom side) can be aggregated to assemble a 3D object that can be navigated or browsed in a 3D virtual environment. It is to be appreciated that the aggregated or collected 2D content can be any suitable number of images or content.

At reference numeral 704, a portion of the 3D object that is unrepresented by the two or more 2D images can be identified based upon the evaluation. In particular, each 2D image can include a pure view that depicts a portion of the 3D object. However, portions of the 3D object may not have 2D content available to aggregate or construct into the 3D object. Such unrepresented areas or portions of the 3D object that are not displayed can be identified. At reference numeral 706, a synthetic view can be generated to replicate the portion of the 3D object that is unrepresented. The synthetic view can simulates the unrepresented content and perspective for the portion of the 3D object that is unrepresented. It is to be appreciated that the synthetic view or simulated synthetic view can be created based upon the two or more 2D content or images utilized to construct the 3D image or object. For instance, the two or more images related to the unrepresented can be analyzed in order to create a synthetic view by merging, blending, combining, extrapolating, inferring, the two or more images related to the unrepresented portion of data.

FIG. 8 illustrates a method 800 for inserting an advertisement within a 3-dimensional virtual environment created from 2-dimensional content. At reference numeral 802, an area within a 3D object that is insufficiently depicted by pure views from 2D content can be identified. For example, a collection of photographs can be assembled based on point-of-view or perspective in order to create a 3D object, wherein the collection of photographs may not have complete views or imagery of the 3D object.

At reference numeral 804, at least one of a scripted movement or a portion of media can be incorporated into the area that is insufficiently depicted by 2D content. For instance, the scripted movement can dictate the manner to which the area is navigated or explored to minimize exposure of such area. Moreover, the area can be overlaid with media such as, but not limited to, advertisements, ads, portions of video, portions of audio, a portion of a graphic, a portion of text, a trademark, a slogan, a service mark, biographical data, image data, author data, etc. At reference numeral 806, a graphical framework for the area can be exposed based on the non-existence of 2D content for the 3D constructed object. Such graphical framework of the 3D image can be representative of a placeholder for 2D content and perspectives that are non-existent.

Figure 9:
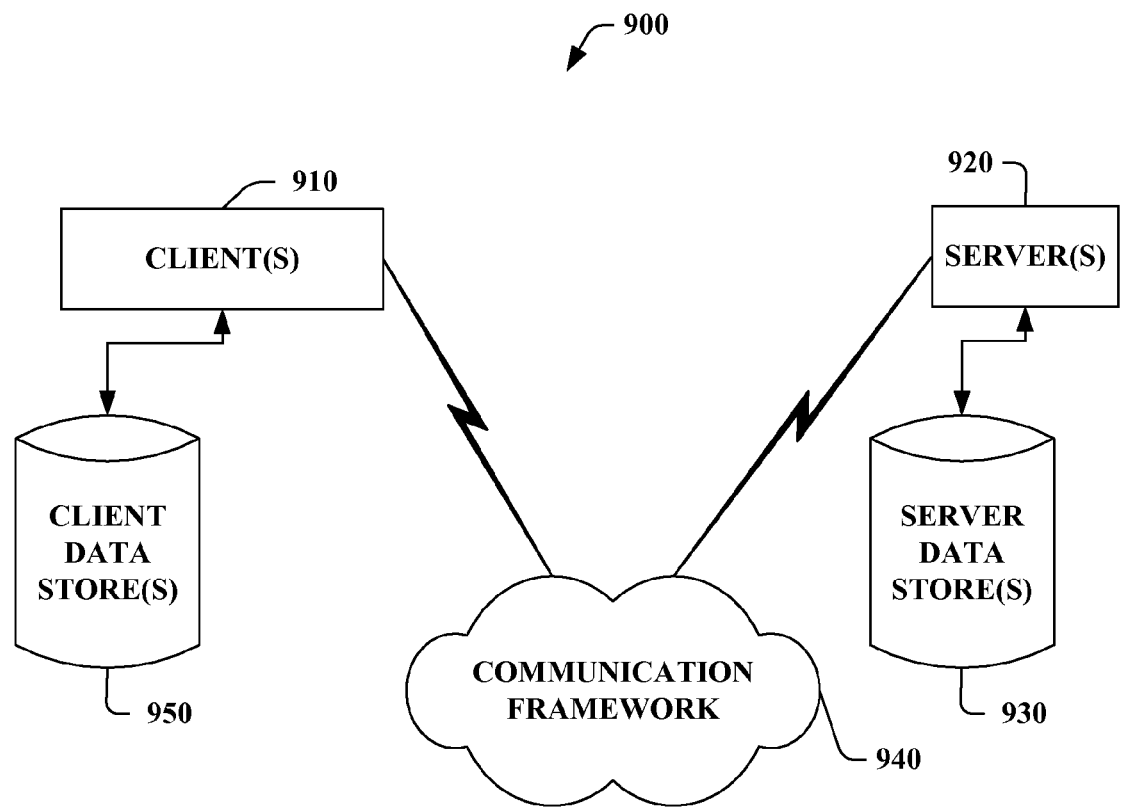
FIG. 9 illustrates an exemplary networking environment, wherein the novel aspects of the claimed subject matter can be employed.
Figure 10:
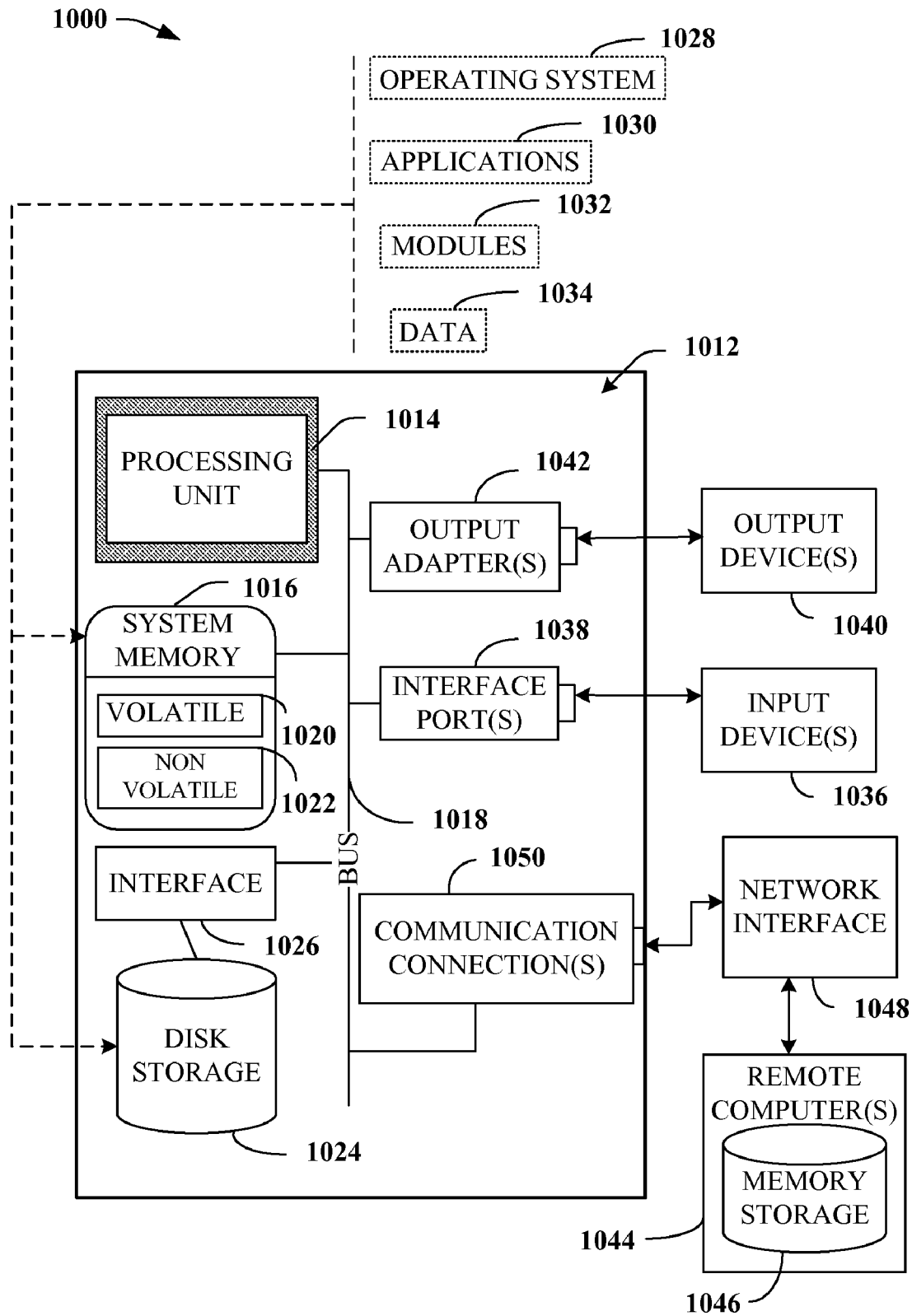
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, the synthetic view generator can render a simulated portion of an image for use with a 3D object within a 3D virtual environment, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates simulating a portion 2-dimensional (2D) data for implementation within a 3-dimensional (3D) virtual environment, comprising:
   a 3D virtual environment that enables a three dimensional (3D) exploration of a 3D image constructed from a collection of two or more 2D images each have a pure view, the 3D image is constructed by combining the two or more 2D images based upon a respective image perspective;
   an analyzer that evaluates the collection of two or more 2D images to identify a portion of the 3D image that is unrepresented by the pure view from the combined two or more 2D images; and
   a synthetic view generator that creates a simulated synthetic view for the portion of 3D image that is unrepresented, the simulated synthetic view replicates a 2D image with a respective image perspective for the unrepresented portion of 3D image.

2. The system of claim 1, the synthetic view generator renders the simulated synthetic view by combining two or more 2D images that include a portion of substantially similar imagery related to the 3D image.

3. The system of claim 1, the synthetic view generator generates a scripted movement between a first image associated with the 3D image and a second image associated with the 3D image, the first image and the second image include a portion of substantially similar imagery related to the 3D image.

4. The system of claim 3, further comprising an ad placement component that inserts a portion of ad data in at least one of the simulated synthetic view or the scripted movement.

5. The system of claim 4, the ad placement component inserts a portion of ad data based upon a portion of content explored within the 3D virtual environment.

6. The system of claim 5, the ad placement component inserts a portion of media in at least one of the simulated synthetic view or the scripted movement.

7. The system of claim 6, the portion of media is at least one of a transient ad, a portion of image, a portion of bio data, a portion of audio, a portion of a video, a portion of text, a portion of a graphic, or a portion of data related to the 3D image.

8. The system of claim 1, the synthetic view generator seamlessly embeds the synthetic view into the 3D image within the 3D virtual environment without disrupting at least one 2D image and respective perspective.

9. The system of claim 1, further comprising a framing component that implements a graphical framework of the 3D image to which the two or more 2D images are overlaid, the graphical framework of the 3D image is exposed in an area not represented by at least one 2D image.

10. The system of claim 9, the graphical framework of the 3D image is a representative of a placeholder for the two or more 2D images that are not replicated with the simulated synthetic view.

11. The system of claim 9, the graphical framework of the 3D image is a representative placeholder for at least one 2D image that is not existent for construction of the 3D image.

12. The system of claim 9, the two or more 2D images are overlaid on the graphical framework to form a skeleton of the 3D image constructed from the two or more 2D images.

13. The system of claim 9, the framing component enables the graphical framework to be displayed based upon a number of 2D images displayed.

14. The system of claim 1, further comprising the 2D image is at least one of a photograph or a portion of a video.

15. The system of claim 1, further comprising a content aggregator that constructs the 3D image from the two or more 2D images based at least in part upon a perspective associated with each 2D image, the 2D image includes a pure view of a portion of the 3D image.

16. The system of claim 15, the pure view of the portion of the 3D image is a portion of imagery depicted by the 2D image from a perspective related therewith.

17. A computer-implemented method that facilitates generating a simulated view from two or more portions of content, comprising:
   combining two or more 2D images to construct a 3D object based at least in part upon a perspective of each 2D image;

identifying a portion of the 3D object that is unrepresented by the combined two or more 2D images, the unrepresented portion is related to a perspective imagery; and generating, by using a computer, a synthetic view to replicate the portion of the 3D object that is unrepresented, the synthetic view is overlaid with a portion of ad data.

18. The method of claim 17, further comprising:

generating a scripted movement associated with the portion of the 3D object that is unrepresented to reduce display of such portion; and incorporating a portion of media into the portion of the 3D object that is unrepresented.

19. The method of claim 17, further comprising exposing a graphical framework for the portion of the 3D object based on a non-existence of a 2D image for the 3D object.

20. A computer-implemented method that facilitates creating 3-dimensional environment from 2-dimensional content, comprising:

constructing, by using a computer, a 3D image from a collection of two or more 2D images by combining the two or more 2D images based at least in part upon a respective image perspective;

enabling a three dimensional (3D) exploration of the 3D image;

evaluating the collection of two or more 2D images to identify a portion of the 3D image that is unrepresented by the combined two or more 2D images;

creating a simulated synthetic view for the portion of the 3D image that is unrepresented, the simulated synthetic view replicates a 2D image with a respective image perspective for the unrepresented portion of the 3D image;

rendering the simulated synthetic view by combining two or more 2D images that include a portion of substantially similar imagery related to the 3D image;

generating a scripted movement between a first image associated with the 3D image and a second image associated with the 3D image, the first image and the second image include a portion of substantially similar imagery related to the 3D image;

inserting a portion of ad data in at least one of the simulated synthetic view or the scripted movement; and inserting the portion of ad data based at least in part upon a portion of content explored within the 3D virtual environment.

* * * * *